Patented July 8, 1924.

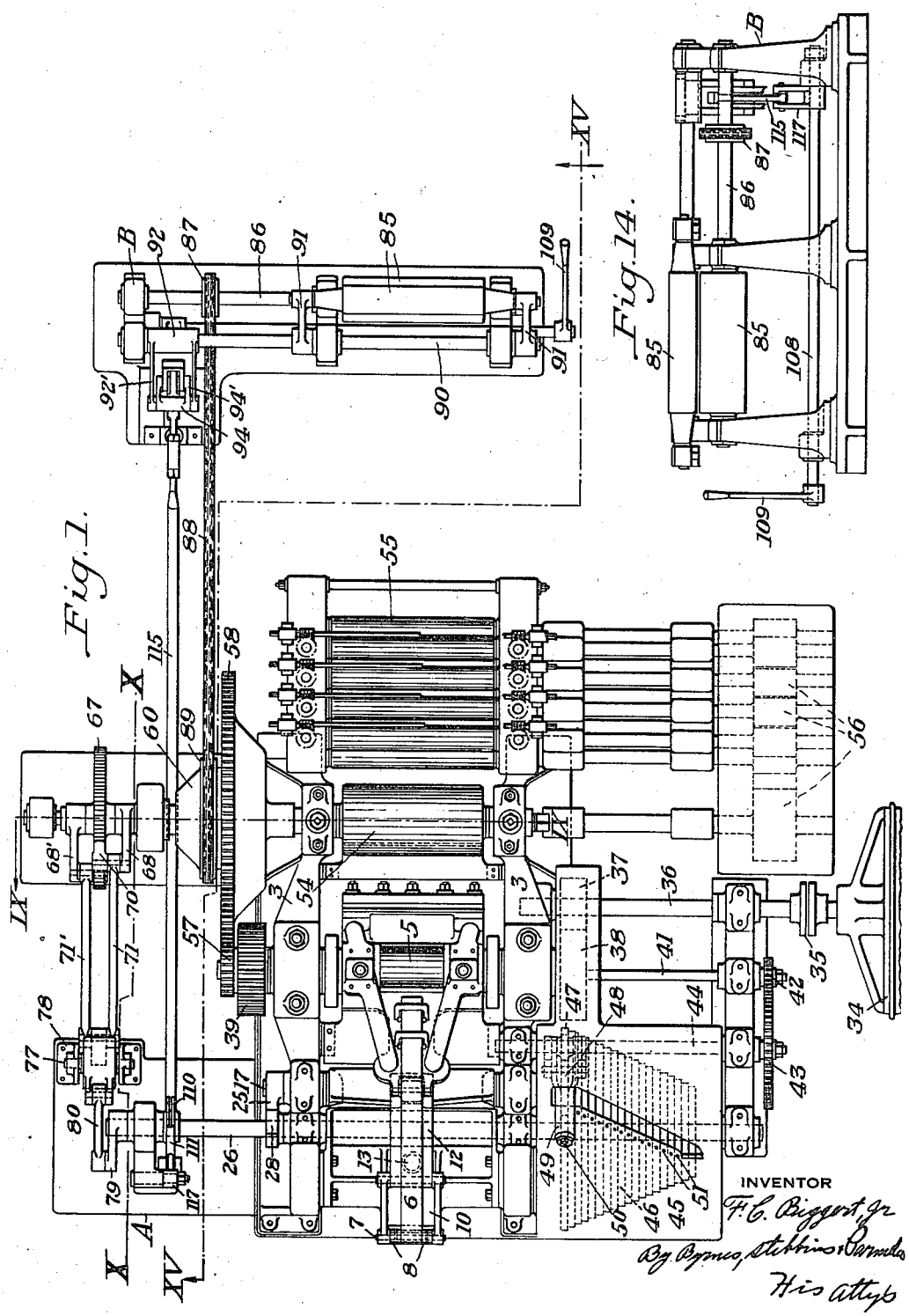

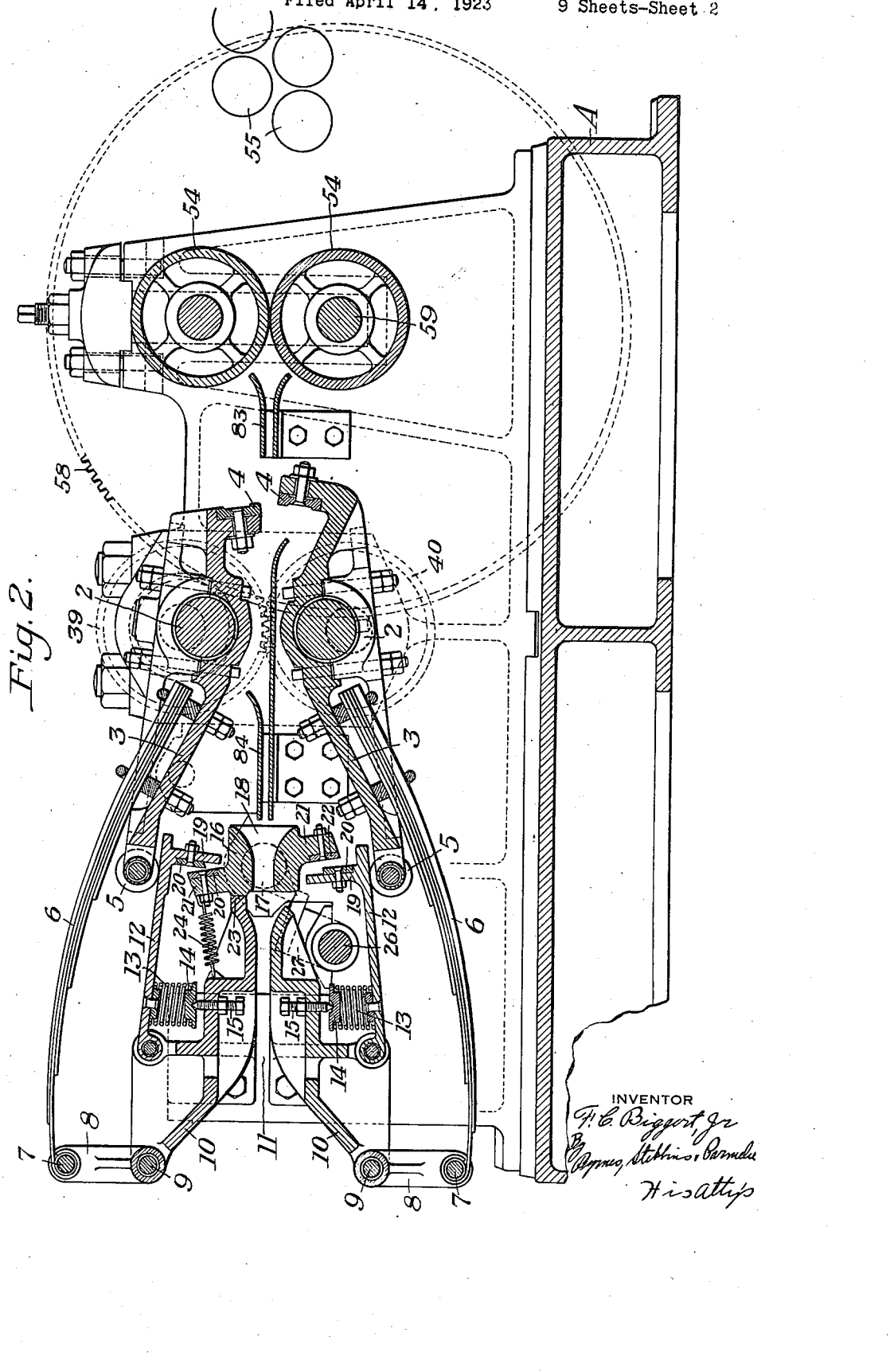

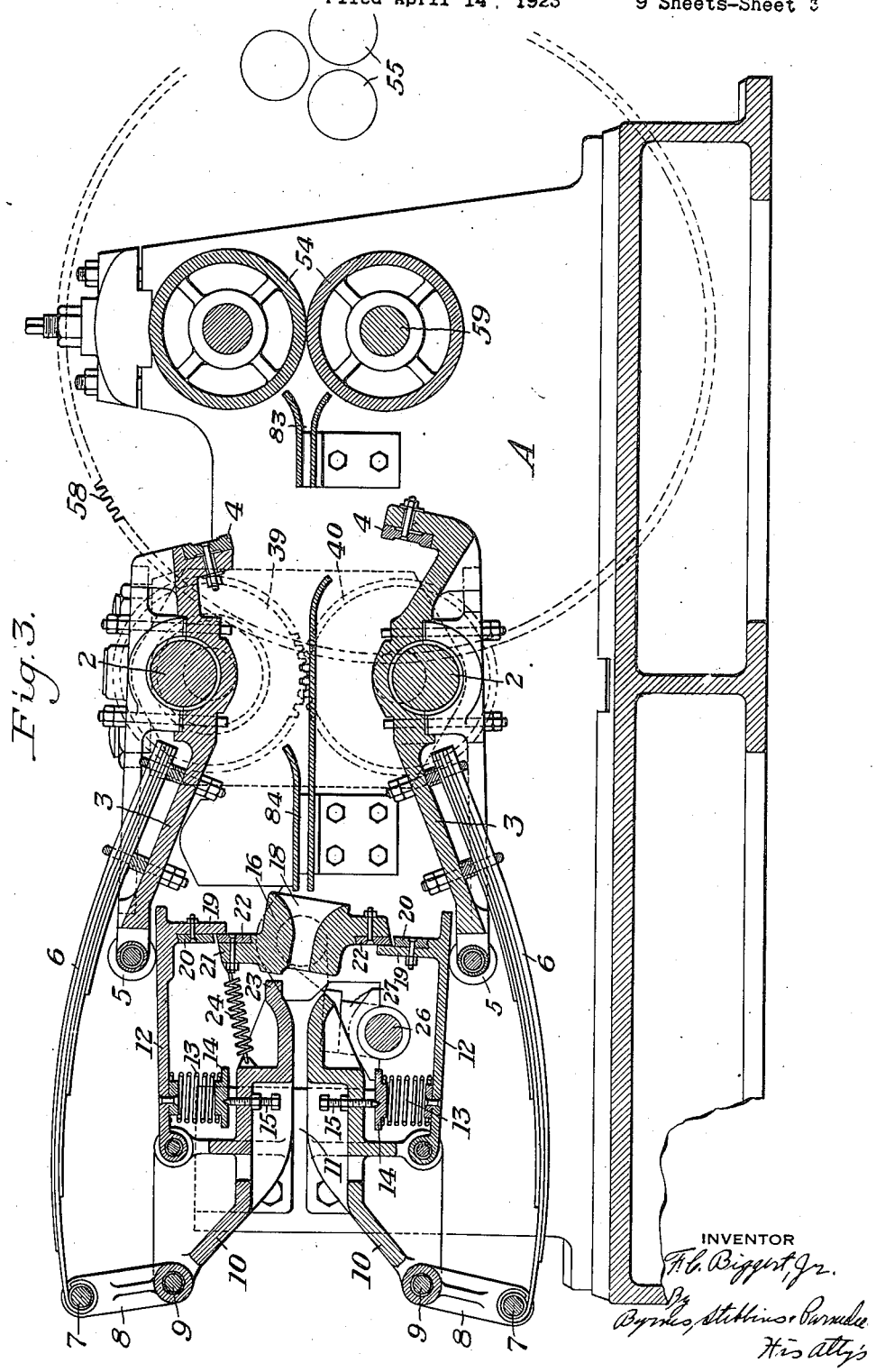

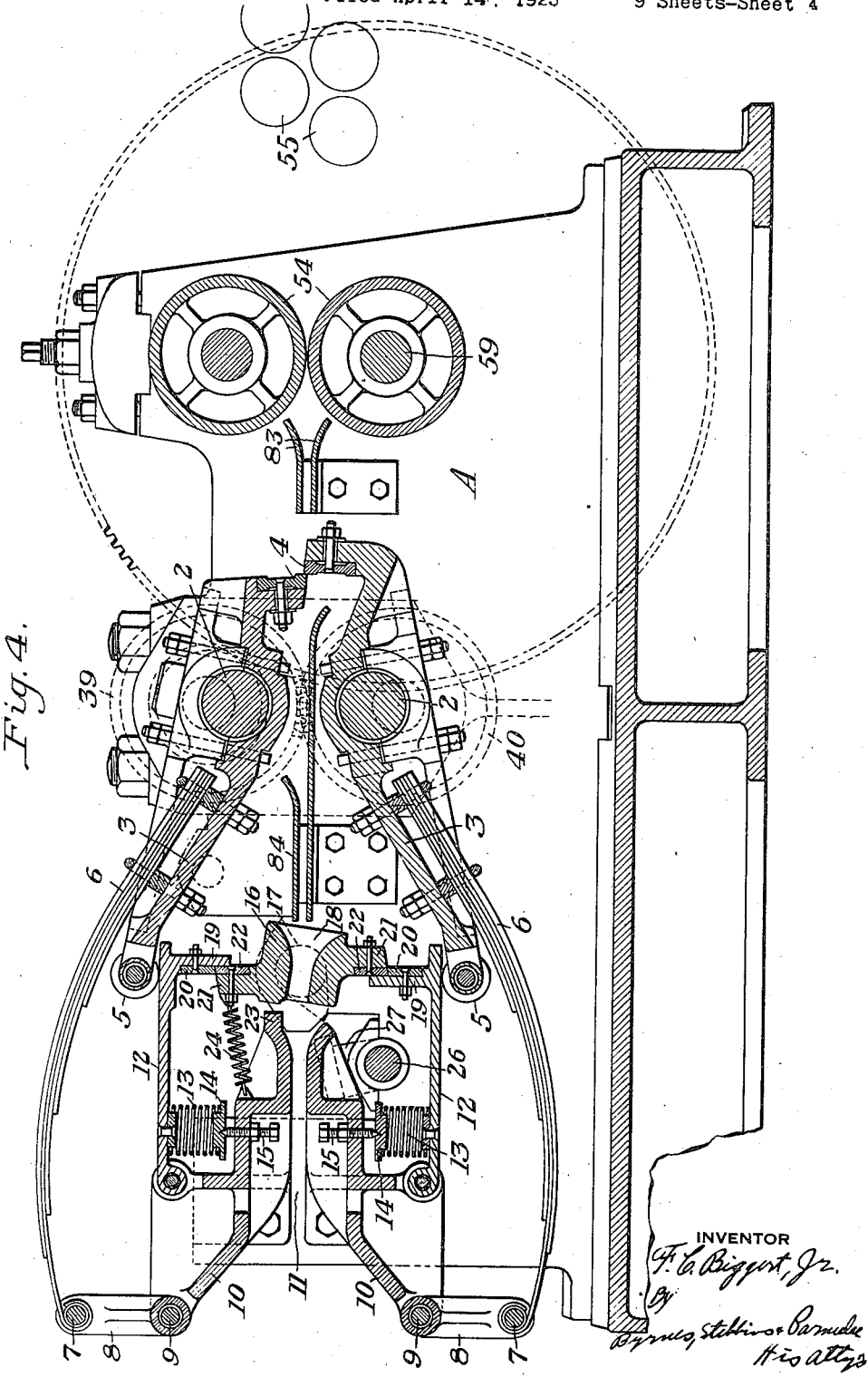

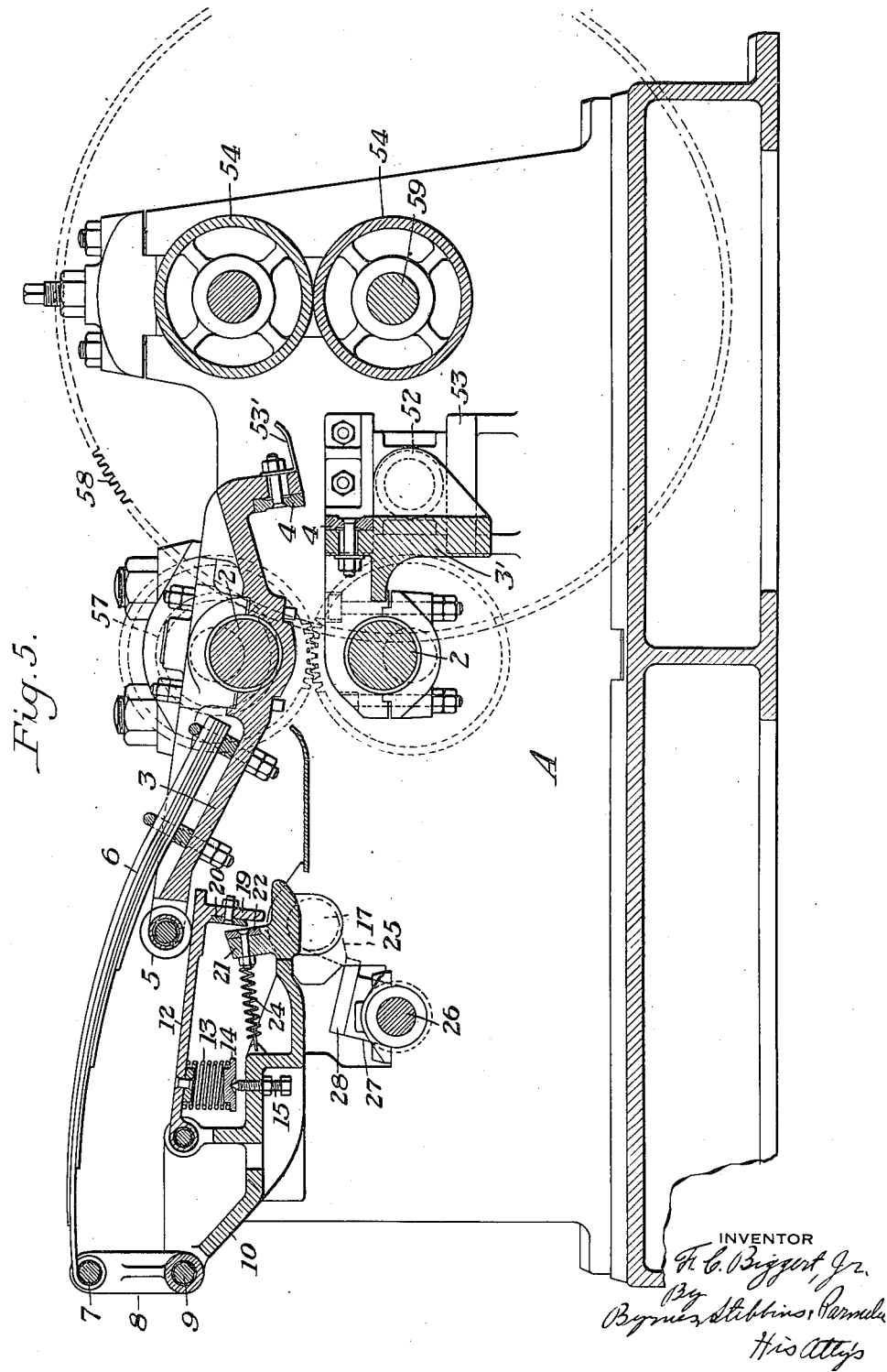

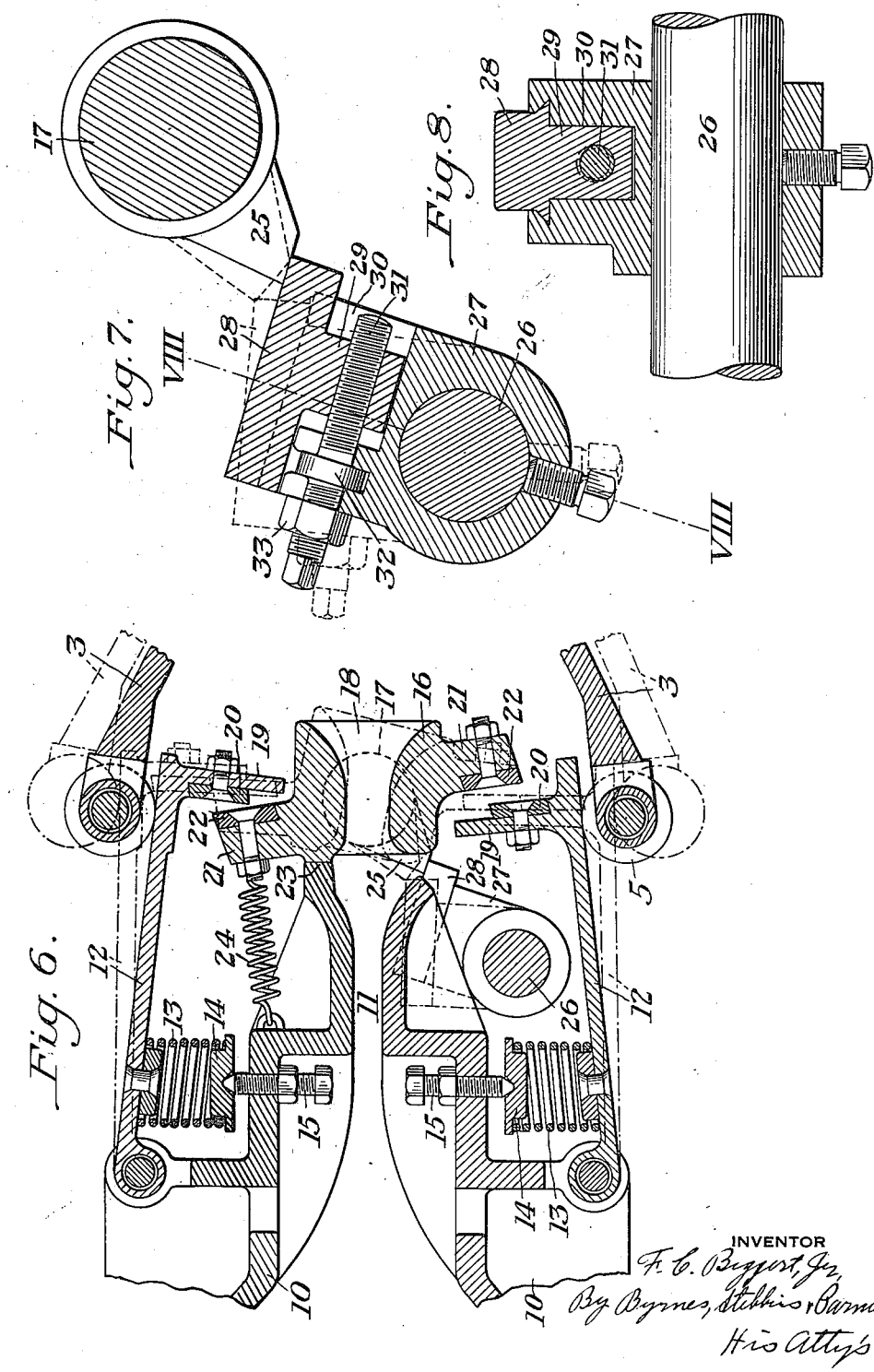

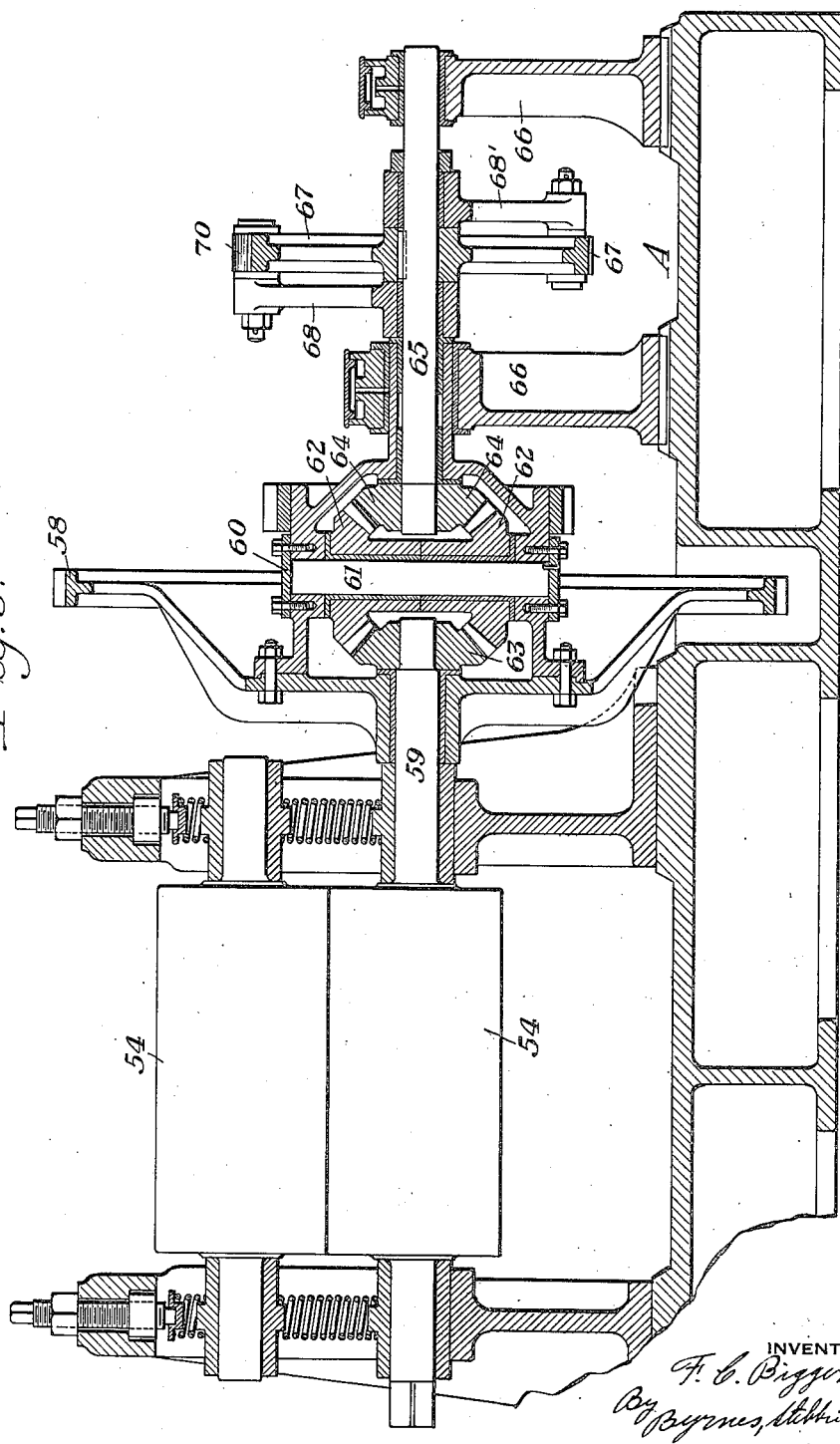

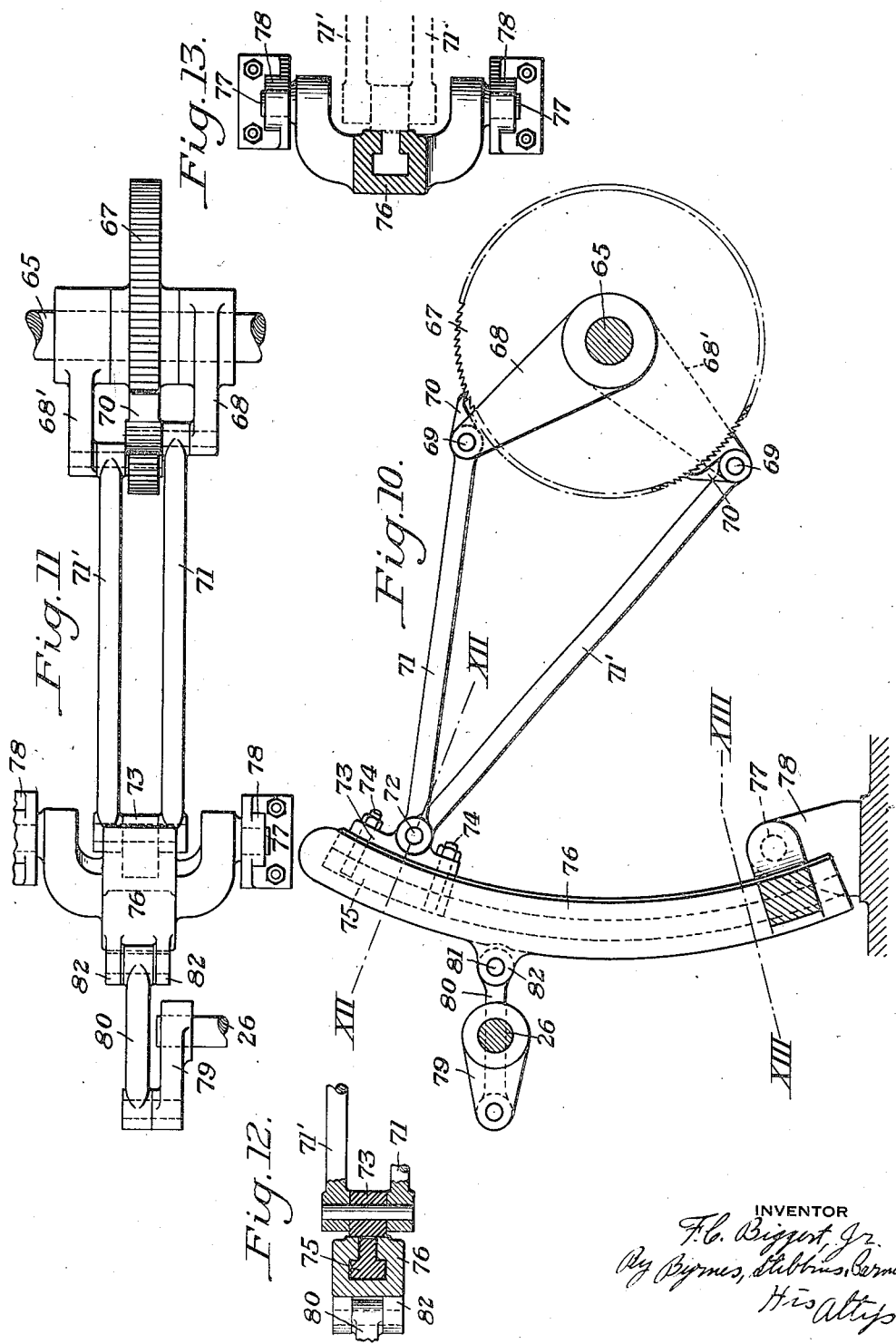

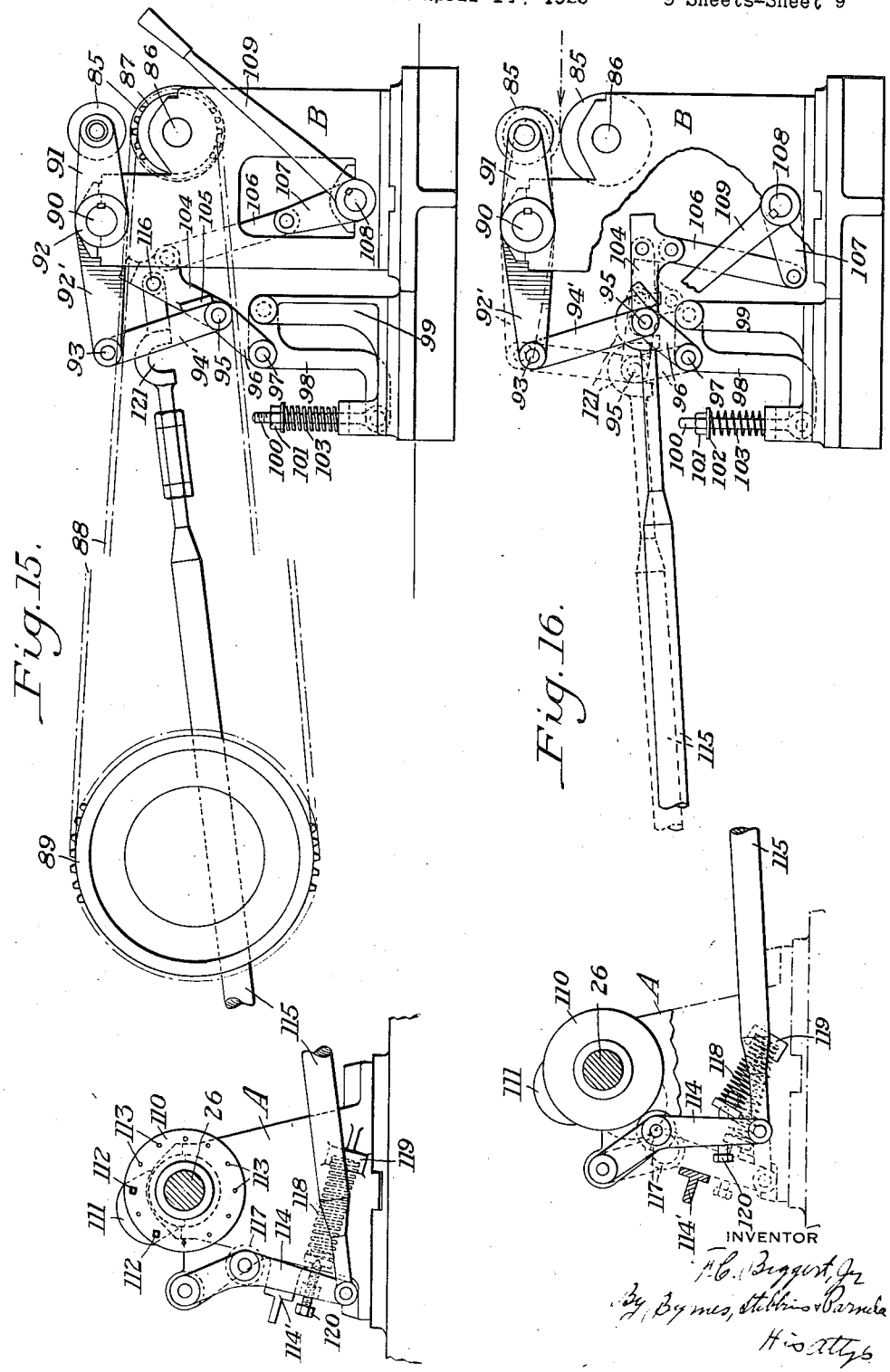

1,500,600

UNITED STATES PATENT OFFICE.

FLORENCE C. BIGGERT, JR., OF CRAFTON, PENNSYLVANIA, ASSIGNOR TO UNITED ENGINEERING AND FOUNDRY COMPANY, OF PITTSBURGH, PENNSYLVANIA, A CORPORATION OF PENNSYLVANIA.

SHEARS.

Application filed April 14, 1923. Serial No. 632,040.

*To all whom it may concern:*

Be it known that I, FLORENCE C. BIGGERT, Jr., a citizen of the United States, residing at Crafton, county of Allegheny, and State of Pennsylvania, have invented a new and useful Improvement in Shears, of which the following is a full, clear, and exact description.

The present invention relates to shears, and more particularly to an improved so-called flying shear.

An important object of the invention is to provide an improved shear embodying cutters and means for moving the same during the cutting operation in the direction of travel of the work and at approximately the same speed as the latter.

A further object of the invention is to provide a shear embodying cutters, means for continuously moving the same toward and from each other, and automatically intermittently operating clutch means for causing the cutters to shear the work.

Another object of the invention is the provision of a shear embodying cutters, automatically intermittently operating means for causing the cutters to shear the work, and change-speed mechanism for varying the time interval between successive cuts.

A further object of the invention is the provision of starting pinch rolls adapted to start to feed a piece of work inserted between the same in predetermined time relation to the operation of the cutters.

In the accompanying drawings there is shown, for purposes of illustration only, one embodiment of the present invention, it being understood that the drawings do not define the limits of the invention, as changes may be made in the construction and operation therein disclosed without departing from the spirit of the invention or scope of my broader claims.

In the drawings:—

Figure 1 is a view of a shear constructed in accordance with the present invention, Figure 2 is a longitudinal vertical sectional view of the shear, illustrating the clutch means in inoperative position and the position of nearest approach of the cutters corresponding to said position of the clutch, Figure 3 is a view similar to Figure 2, illustrating the operative position of the clutch means and the farthest apart position of the cutters, Figure 4 is a view similar to Figure 3, illustrating the shearing position of the cutters, Figure 5 is a view corresponding to Figure 2, illustrating a slightly modified construction, Figure 6 is a detail sectional view, on an enlarged scale, of the clutch means, Figure 7 is a detail sectional view illustrating the adjustable cam member for operating the clutch means, Figure 8 is a sectional view on the line VIII—VIII of Figure 7, Figure 9 is a transverse sectional view taken on the line IX—IX of Figure 1, illustrating a portion of the differential mechanism, Figure 10 is a view, partly in elevation and partly in section, of a portion of the differential mechanism, the section being taken on the line X—X of Figure 1, Figure 11 is a plan view of the structure shown in Figure 10, Figure 12 is a sectional view taken on the line XII—XII of Figure 10, Figure 13 is a sectional view taken on the line XIII—XIII of Figure 10, Figure 14 is a front elevation of the starting pinch rolls, Figure 15 is a broken away view, partly in elevation and partly in section, of the starting pinch rolls and the mechanism for operating the same, the section being taken on the line XV—XV of Figure 1, and Figure 16 is a view corresponding to Figure 15, but showing the parts in a different position.

The mechanism herein disclosed is constructed and arranged to feed strip material at a predetermined rate of travel to cutting means, which is automatically operated to cut such strip material into predetermined uniform lengths.

Referring to Figures 1 to 4, inclusive, of the drawings, A indicates the frame of the machine having journaled therein a pair of crank-shafts 2 adapted to be driven at uniform speed by means to be hereinafter described.

Journaled upon the crank portion of each of said shafts is a knife lever 3 having bolted or otherwise secured to its forward end a knife 4, and having a bifurcated rear end, between the arms of which is journaled an anti-friction roller 5 upon a pin fixed in said bifurcated rear end. Each lever 3 has the forward end of a leaf spring 6 secured thereto, each of said springs being journaled at its rear extremity upon a pin 7 fixed in one extremity of a pair of links 8, each pair of links being journaled at its opposite extremity upon a pin 9 fixed in the rear end of a casting 10, the said castings forming part of clutch means for automatically controlling the operation of the knives 4 and being spaced apart to provide a guide passage 11 therebetween for the work.

Pivotally connected at its rear extremity to each of the castings 10 is a clutch lever 12, and interposed between each of said levers and the casting to which it is pivoted is a coil spring 13, said spring bearing at one end against the lever, and at its opposite end against a cap 14, the latter engaging the end of an adjustable screw 15 carried by the casting, whereby to vary the tension of said spring. The levers 12 afford rolling surfaces for the anti-friction rollers 5 carried by the knife levers 3.

As the crank-shafts 2 rotate, the knife levers 3 are moved bodily in such manner as to cause the rollers 5 to roll back and forth in contact with the clutch levers 12, and the edges of the knives 4 to describe elliptical paths. The position of the knife levers 3, knives 4 and clutch levers 12, when the crank portions of the crank-shafts are nearest each other, is illustrated in Figure 2, and the position of the same parts, when the said crank portions are farthest apart, is illustrated in Figure 3. It will be seen that in the Figure 2 position of the parts, the cutting edges of the knives are separated sufficiently to permit the work to pass therebetween without being cut, although the crank portions of the crank-shafts are in their position of nearest approach.

In order to cause the cutting edges of the knives 4 to come together and shear the work passing therebetween, means is provided, which is automatically actuated in timed relation to the operation of the crank-shafts 2, for engaging the clutch levers 12 when they are in the position shown in Figure 3, and holding them temporarily in that position, so that, as the crank-shafts continue to rotate, the knife levers 3 fulcrum about the axes of the rollers 5 journaled in their rear extremities, and the edges of the knives 4 come together and pass each other to shear the work when the crank portions of the crank-shafts are again in their position of nearest approach, this position of the parts being illustrated in Figure 4.

The means referred to comprises a clutch 16 fixed to a rock-shaft 17 and formed with a guide opening 18 therethrough in alinement with the guide passage 11. Each of the clutch levers 12 has an integral arm 19 extending at right angles thereto, and having bolted or otherwise secured thereto an interlock member consisting of a thin plate 20 of hard steel provided with an undercut edge. The clutch 16 has oppositely extending arms 21, to each of which is secured an interlock member 22 similar to the interlock members 20, but having a beveled edge for interlocking engagement with the undercut edge of the corresponding interlock member 20. The upper casting 10 is provided at its forward extremity with a stop shoulder 23 and a spring 24, fastened at one end to said casting and at its opposite end to the upper arm 21 of the clutch 16, tends to normally maintain said clutch in engagement with said stop, as illustrated in Figure 2. In this position of the clutch, the clutch levers 12 are permitted to swing toward each other under the pressure of the rollers 5 as the crank-shafts 2 move the knife levers 3 toward each other. For rocking the clutch 16 into the operative position shown in Figure 3, the rock-shaft 17 has secured to one extremity thereof a trip arm 25, and fixed to a driven shaft 26 is an arm 27 having adjustably mounted upon the end thereof a cam 28 for actuating the trip arm.

A form of adjustable mounting of the cam 28 on the arm 27 is illustrated in detail in Figures 7 and 8, by reference to which it will be seen that the cam 28 is slidably mounted upon the end of the arm 27 and has an integral lug 29 depending into a slot 30 in said arm, and engaged by the threaded portion of a bolt 31 rotatably mounted in the arm 27, and having an integral collar 32 engaging in a slot in said arm to prevent longitudinal movement of the bolt, said bolt being adapted to be locked in adjusted position by means of a nut 33.

The shaft 26 rotates in an anti-clockwise direction, and during each revolution of the shaft, the cam 28 engages the arm 25 and thereby rocks the shaft 17 to swing the clutch 16 from the inoperative position shown in Figure 2 to the operative position illustrated in Figure 3. It will be apparent that the operation of the clutch 16 must be properly timed with relation to the rotation of the crank-shafts 2, in order to permit the parts to assume the position shown in Figure 3, wherein the knife levers 3 are shown in their farthest apart position, permitting the springs 13 to swing the clutch levers 12 away from each other, so as to provide clearance between the undercut edges of the interlock members 20 and the beveled edges of the interlock members 22. The cam 28 is shown in a position in which it is just about to release the trip arm 25. However, the crank-shafts 2 rotate much faster than the shaft 26, so that, before the cam 28 is moved to release the trip arm 25, the crank-shafts 2 will have begun to move the knife levers 3 toward each other, and the pressure of the rollers 5 upon the clutch levers 3 will have moved these levers toward each other and taken up the clearance between the undercut edges of the interlock members 20 and the beveled edges of the interlock members 22, whereby the interlocking engagement between the interlock members 20 and 22 will prevent the spring 24 from rocking the clutch 16 into inoperative position until the clutch levers 12 again assume the position shown in Figure 3, even though the trip arm 25 has been released by the cam 28. Continued rotation of the crank-shafts 2 moves the knife levers 3 into the position shown in Figure 4, in which the knife edges have been moved past each other to shear the work.

The crank-shafts 2 and the shaft 26 are driven by a motor 34 through the following means: The motor is operatively connected through a suitable clutch 35 with a shaft 36 journaled in the frame A, and having fixed thereon a gear 37 meshing with a gear 38 on one end of the upper crank-shaft 2, the lower crank-shaft having on the corresponding end a similar gear (not shown) meshing with said gear 38. The upper crank-shaft 2 has on its opposite end a gear 39 meshing with a similar gear 40 on the corresponding end of the lower crank-shaft. By having intermeshing gears on both ends of the crank-shafts, evenness of drive of the crank-shafts is insured. The gear 38 also drives a shaft 41 parallel to the shaft 36, and having fixed on one end thereof a gear 42 meshing with a gear 43 on the corresponding end of a shaft 44. The shaft 44 drives the shaft 26 through speed-change gearing arranged in a housing 45. This speed-change gearing comprises a plurality of gears 46 of different sizes mounted on the shaft 26 and a gear 47 keyed to and shiftable on the shaft 44 and meshing with a gear 48 journaled in a rocker arm 49. The rocker arm 49 is bifurcated to straddle the gears 47 and 48, and is journaled loosely at its bifurcated end upon the shaft 44. At its other end the arm 49 carries a spring-pressed pin 50 adapted to engage any one of a plurality of holes 51 in the housing 45 to hold the gear 48 in mesh with the desired one of the gears 46.

It will be apparent that the shaft 26 is driven at a slower speed than the crank-shafts 2, and the change-speed mechanism described provides means for varying the speed of rotation of the shaft 26, while maintaining that of the crank-shafts 2 constant. The speed of rotation of the shaft 26 can be still further varied by changing the ratio of the gears 42 and 43. It should be observed, however, that the number of complete revolutions made by the crank-shafts 2 in a given period of time must be an exact multiple of the number of revolutions made by the shaft 26 in the given period, otherwise the cam 28 would not operate the clutch 16 in proper timed relation to the operation of the crank-shafts to swing said clutch into the operative position shown in Figure 3 at the moment when the clutch levers 12 are farthest apart, and therefore providing clearance between the undercut edges of the interlock members 20 and the beveled edges of the interlock members 22.

In Figure 5 a slightly modified construction is shown particularly adapted for cutting off the crop end of strip material. In this form of the invention, the upper knife lever 3 is the same as illustrated in Figures 2, 3 and 4, but a modified form of lower knife lever 3' is employed. The lever 3' is journaled at its rear end upon the lower crank-shaft 2, and is provided at its forward end with a roller 52 (shown in dotted lines) engaging the upper horizontal face of a bracket 53 integral with the frame A. It will be seen that the knife lever 3' fulcrums about the axis of the roller 52 during the rotation of the lower crank-shaft 2. The lever 3' is shown in a horizontal position, and this is the position of the lever when a cut is made, but continued rotation of the crank-shaft causes a lowering of the rear end of the lever after the cut is made, so that the end of the material sheared off readily slides off of the inclined lever. The upper lever 3 has secured to its forward end a presser foot 53' for engaging the material during the shearing operation. It will be noted also that the upper knife 4 is secured to the rear face of the forward end of the knife lever 3, and that the lower knife 4 is secured to the front face of the lower knife lever 3', this being a reversal of the arrangement of the knives shown in Figures 2, 3 and 4.

Referring to Figures 1 to 5, inclusive, and Figure 9, arranged at the front of the machine is a pair of pinch rolls 54, and in front of the latter is a set of leveling rolls 55. The lower pinch roll is driven by the motor 34 through driving connections, including differential gearing to be described hereinafter, and said lower pinch roll and the leveling rolls are geared together to rotate at the same peripheral speed by a suitable gear train 56.

Fixed to the end of the upper crank-shaft 2, adjacent the gear 39, is a gear 57 meshing with a large gear 58 journaled upon a shaft 59, which carries the lower pinch roll 54.

Referring to Figure 9, the gear 58 has bolted to one face thereof a differential housing 60 having fixed therein a shaft 61 extending at right angles to the shaft 59, and upon which is journaled a pair of beveled pinions 62. The pinions 62 mesh with a beveled pinion 63 fixed to the end of the shaft 59, and also with a beveled pinion 64 fixed to the end of the shaft 65 in alinement with the shaft 59, and journaled in spaced standards 66 forming part of the frame A.

Keyed to the shaft 65 between the standards 66 is a ratchet wheel 67, and journaled at one end upon said shaft upon opposite sides of said ratchet wheel is a pair of rocker arms 68 and 68'. Referring to Figures 10 and 11, it will be seen that each of the arms 68 and 68' has secured to its free end a pin 69 extending at right angles thereto across the toothed periphery of the ratchet wheel 67, each pin having journaled thereon a pawl 70 for engagement with the teeth of the ratchet wheel. A link 71 is journaled at one end upon the pin 69 of the arm 68 between said arm and the pawl 70, and a link 71' is journaled at one end upon the pin 69 of the arm 68'. The links 71 and 71' are journaled at their opposite end upon the extremities of a pin 72 which extends through and is secured to a block 73 secured by bolts 74 to a member 75 of T-shape in cross section slidably mounted in a groove of similar shape in cross section formed in a curved lever 76. The lever 76 is bifurcated at its lower end, and said lower end is provided with pivot pins 77 journaled in spaced bearings 78 of the frame A, as illustrated in Figures 1 and 13. The shaft 26 has secured to an end thereof a crank-lever 79, and pivotally connected at one end to the end of said crank-lever is a link 80 having its opposite end journaled upon a pin 81 carried by spaced ears 82 integral with the curved lever 76. As the shaft 26 rotates, the lever 76 is rocked back and forth through the described connection between said shaft and lever, and assuming the block 73 to have been adjusted to some such position as shown in Figure 10, as the lever 76 is rocked forwardly or to the right (Figure 10), the link 71 rotates the arm 68 in a clockwise direction, and the pawl 70 carried by said arm, through its engagement with the teeth of the ratchet wheel 67, causes said wheel also to rotate in a clockwise direction. At the same time, the link 71' causes the arm 68' to rotate in an anti-clockwise direction, and the pawl 70 carried by said arm to ride over the teeth of the ratchet wheel. As the lever 76 is rocked rearwardly or to the left, the arm 68 is rotated in an anti-clockwise direction, and the pawl 70 carried thereby rides over the teeth of the ratchet wheel, while the arm 68' is rotated in a clockwise direction, and the pawl 70 carried thereby, through its engagement with the teeth of the ratchet wheel 67, causes said wheel to rotate in a clockwise direction. It will be apparent that the amplitude of movement of the pin 72 is greater the farther the said pin is adjusted away from the pivotal axis of the lever 76, this adjustment of the pin 72 being secured by loosening the nuts on the bolts 74, so as to permit the member 75 to slide in the groove of the lever 76 and subsequently tightening said nuts to secure the block 73 in adjusted position. It will also be evident that when the pin 72 is in axial alinement with the pivotal axis of the lever 76, movement of said lever will have no effect upon the links 71 and 71', so that movement will not be imparted to the ratchet wheel 67. A point to be observed, however, is that the engagement of the pawls 70 with the teeth of the ratchet wheel 67 causes said wheel to be held at all times against rotation in an anti-clockwise direction, whereby the shaft 65 and beveled pinion 64 are also held at all times against rotation in said direction. Therefore, as the gear 58 is rotated in an anti-clockwise direction, Figures 2, 3, 4 and 5, the beveled pinion 64, being held against rotation in that direction, causes the beveled pinions 62 to rotate in opposite directions, and drive the beveled pinion 63 on the shaft 59 in an anti-clockwise direction. The lower pinch roll 54 and the leveling rolls 55 may thus be driven by the motor 34 at a uniform peripheral speed through the gear 58 and the differential mechanism described. When the pin 72 is adjusted out of alinement with the pivotal axis of the lever 76, rocking movement of the lever 76 causes the ratchet wheel 67 to rotate in a clockwise direction, and through the differential gearing to increase the speed of rotation of the lower pinch roll 54. In other words, the speed of angular rotation of the lower pinch roll is at such time equal to the speed of angular rotation of the gear 58, plus the speed of angular rotation of the ratchet wheel 67.

The operation of the entire mechanism so far described may be summarized as follows: The strip material to be sheared is fed by the leveling rolls 55, which serve to take out any bends or kinks in the same, to the pinch rolls 54 which feed said material through the guiding means 83 and 84 (Figures 2, 3 and 4) between the continuously actuated knives 4. The crank-shafts 2 are rotated at a constant speed by the motor 34, as are also the lower pinch roll 54 and the leveling rolls 55. Let it be assumed, by way of example, that for each revolution of the crank-shafts 2, the pinch rolls and leveling rolls feed the material a linear distance of one foot, and let it be further assumed that it is desired to cut the material into uniform lengths of five feet each. The change-speed mechanism must then be set to cause the shaft 26 to make one complete revolution for every five complete revolutions of the crank-shafts 2. If it is desired to shear the material into uniform lengths of six feet each, the change-speed mechanism must be set to cause the shaft 26 to make one complete revolution for every six revolutions of the crank-shafts 2, and so on. It will be apparent that, under these conditions, the change-speed mechanism provides means whereby to vary the length of the sheared material by increments or decrements of one foot each. Now suppose it is desired to cut the material into lengths of, for example, five feet three inches. This would be accomplished by setting the change-speed mechanism to cause the shaft 26 to make one complete revolution for every five complete revolutions of the crank-shafts 2, and by then adjusting the block 73 on the lever 76 into such position that the rotation of the ratchet wheel 67 caused by the rocking movement of the lever 76, increases, through the differential gearing, the speed of rotation of the lower pinch roll 54 and of the leveling rolls 55 to such an extent that the material is fed five feet three inches, instead of five feet, during each five complete revolutions of the crank-shafts 2. In other words, the change-speed mechanism provides a rough adjustment for varying the length of the sheared material, while the differential mechanism provides for a fine adjustment for that purpose.

Referring to Figures 1, 14, 15 and 16, a pair of starting pinch rolls 85 is provided in advance of the leveling rolls 55 for a purpose which will be hereinafter set forth. The lower pinch roll 85 is carried by a shaft 86, which is journaled in a supplemental frame B and has fixed thereon a sprocket wheel 87, a sprocket chain 88 connecting said sprocket wheel 87 with a sprocket wheel 89 carried by the differential housing 60. Through this driving connection the lower starting pinch roll is driven at the same peripheral speed as the lower pinch roll 54 and the leveling rolls 55 through the gear 58.

The frame B also has journaled therein a rock-shaft 90 parallel to the shaft 86. A pair of rocker arms 91 is keyed to the rock-shaft 90 and have journaled in their free ends the upper starting pinch roll 85. The rock-shaft 90 also has keyed thereto a sleeve 92 integral with which is a pair of parallel rearwardly extending arms 92', in the free ends of which is fixed a pin 93, and journaled upon the pin 93 between the arms 92' is a sleeve 94 having integral therewith a pair of downwardly extending links 94', in the lower free ends of which a pin 95 is mounted. Journaled at one end upon the pin 95 is a pair of parallel spaced links 96, which at their other end are journaled upon pins 97 projecting from opposite faces of a double bell-crank lever 98. The lever 98 is pivoted at one end to a standard 99 of the frame B, and at its other end is pivoted to the lower end of a vertical bolt 100 extending through an opening in a part of the frame B. The upper end of the bolt 100 is threaded and has a nut 101 and washer 102 mounted thereon, and surrounding the bolt and interposed between the frame B and washer 102 is a coil spring 103. The links 94' and 96 constitute a toggle connecting the bell-crank lever 98 with the arms 92'.

Journaled at its lower end upon the pin 95 is an inverted U-shaped lever 104 having an integral stop 105 formed on one of its arms for engagement with one of the links 94'. Pivoted at one end to the upper end of the lever 104 is a link 106, the lower end of which is pivoted to the end of a rocker arm 107, the latter being keyed to a rock-shaft 108 journaled in the frame B. The rock-shaft 108 has fixed to the end thereof an operating handle 109.

The shaft 26 has mounted thereon a disk 110, and secured thereto is a cam 111. The cam 111 is mounted on the disk by means of bolts 112, and the disk is provided with a series of bolt openings 113 around its entire circumference, whereby the angular relation of the cam 111 with respect to the clutch operating cam 28 can be adjusted for a purpose to be hereinafter described. A bell-crank lever 114 is pivoted at its upper end to the frame A adjacent the disk 110, and said lever has pivotally connected to its lower end one end of an adjustable connecting rod 115, said rod being journaled at its other end upon a pin 116 carried by the lever 104, the arms of said lever 104 straddling the end portion of said connecting rod. The bell-crank lever 114 has journaled thereon an anti-friction roller 117 for co-operation with the cam 111, said roller being normally maintained out of the path of said cam by means of a coil spring 118 engaging at one end in a socket 119 formed on the frame A, and at its other end against an adjustable screw 120 carried by the bell-crank lever 114. A stop 114' formed on the frame A serves to limit movement of the lever 114 in a direction away from the disk 110. The connecting rod 115 is provided with a hook portion 121 adapted to engage the pin 95.

The purpose of the starting pinch rolls is to enable the first cut to be made at any desired distance from the end of a strip of material, so that the crop end of the material may be sheared off without undue waste. The operation of the starting pinch roll mechanism is as follows: With the parts in the position shown in Figure 15, the upper pinch roll 85 is elevated out of operative relation to the lower pinch roll, and a strip of material inserted between said rolls would not be fed into the machine. If, however, the operating handle 109 is thrown over from the position shown in Figure 15 to that shown in Figure 16, the hook portion 121 of the connecting rod 115 will be pulled down over the pin 95, and at the same time the connecting rod will be drawn upwardly, swinging the lever 114 toward the disk 110 and compressing the spring 118 until the anti-friction roller 117 is in engagement with the periphery of said disk 110. This position of the parts is shown in full lines in Figure 16. It will be seen that the toggle before mentioned is in substantially the same position as in Figure 15. When, however, the cam 111 engages the anti-friction roller 117, the lever 114 will be rocked away from the disk 110, pulling the rod 115 rearwardly, thereby straightening the toggle 94' and 96, and ultimately moving it into the dotted line position shown in Figure 16, in which position said toggle is slightly past dead center. This movement of the toggle forces the upper starting pinch roll 85 into engagement with the lower pinch roll, or with the material inserted between said rolls.

In order to render the function of the starting pinch rolls more apparent, let it be assumed that the pinch rolls are located at a distance of ten feet in advance of the knives 4, and let it be further assumed that the lower pinch roll 54 and the leveling rolls 55 are being driven at such speed that a strip of material will be fed thereby at a rate of one linear foot during each complete revolution of the crank-shafts 2, and also let it be assumed that the change-speed mechanism is set to cause one complete revolution of the shaft 26 for every ten revolutions of the crank-shafts 2. Under these conditions, a strip of material would be fed a linear distance of ten feet between successive cutting operations of the knives 4. Now if it is desired that the first cut on a strip of material shall shear off a length of five feet from the crop end of the strip, the cam 111 will be adjusted 180 degrees ahead of the cam 28, and when this is done, the end of the strip to be sheared may be inserted between the starting pinch rolls 85 and the operating handle moved from the position shown in Figure 15 to the position shown in Figure 16, thereby moving the bell-crank lever 114 toward the disk 110 until the anti-friction roller 117 engages the periphery of said disk. When the cam 111 engages the anti-friction roller 117, the parts are immediately moved into the dotted line position shown in Figure 16, in which position of the parts the material will be pinched between the starting pinch rolls, and these rolls will immediately begin to feed the material forward. Since the cam 111 is 180 degrees in advance of the cam 28, the strip will be fed five feet before the knives assume the cutting position shown in Figure 4, and when they again assume this position, the strip will have been fed another ten feet. Since the distance between the starting pinch rolls and the knives is only ten feet, it will be apparent that the first cut will shear off a length of five feet from the strip. By properly adjusting the cam 111 on the disk 110, any desired length may be sheared off by the first cut. After the first cut has been made, the operating handle may be moved to the inoperative position shown in Figure 15.

It will be apparent that the present shear provides in effect two knife levers 3 constituting levers of the third class. Normally these knife levers are continuously bodily moved alternately in the direction of travel of the material to be sheared and in the opposite direction, and concomitantly continuously alternately moved toward and from the material to be sheared. Normally the amount of the latter movement is insufficient to cause the paths of travel of the shearing blades to intersect and thereby effect shearing. Means is provided, however, for periodically automatically increasing the amount of this latter movement to effect shearing of the material by providing fulcrum points for the levers which are periodically maintained a fixed distance apart. The point of application of the power is intermediate the ends of the levers, and this action produces angular movement of the levers about the crank-shafts 2 sufficient to cause the paths of travel of the knives to intersect.

In the form of the invention illustrated in Figure 5, the movement of the shearing means normal to the line of travel of the material is a relative one, while with the other form of my invention the movement is not only relative but is produced by simultaneously moving both of the shearing means.

A common drive is provided for the shearing knives and for the means which delivers the material to the knives. It will be apparent, however, that the differential mechanism provided enables the material delivery means to feed the material at regulable speeds which may be adjusted at will independently of the speed of operation of the knives.

Many advantages are inherent in the construction thus provided. The mechanism for shearing and for delivering the material is in the form of a complete unit, thereby facilitating the relative adjustments therebetween.

The main operating parts of the shear, including the crank-shafts 2, are continuously operated, thereby making it unnecessary to overcome the inertia thereof for each shearing operation. This enables the shear to be more uniformly operated with a less expenditure of power.

Still further advantages arise from the means for effecting the desired timing between the various parts whereby accuracy and uniformity in the length of the sheared pieces is insured.

I claim:

1. In a method of shearing, the steps consisting in continuously moving the material to be sheared, moving a shearing member on each side of said material alternately in the direction of movement of said material and in the opposite direction, normally concomitantly producing relative movement of said shearing members toward and from each other transversely of the path of travel of said material, without causing said members to intersect said path, and periodically increasing the amount of said relative movement to cause said shearing members to effect shearing of said material, substantially as described.

2. In a method of shearing, the steps consisting in continuously moving the material to be sheared, continuously moving a shearing member on each side of said material alternately in the direction of movement of said material and in the opposite direction, normally continuously concomitantly producing relative movement of said shearing members toward and from each other transversely of the path of travel of said material, without causing said members to intersect said path, and periodically increasing the amount of said relative movement to cause said shearing members to effect shearing of said material, substantially as described.

3. In a method of shearing, the steps consisting in continuously moving the material to be sheared, moving a shearing member on each side of said material alternately in the direction of movement of said material and in the opposite direction, normally concomitantly producing simultaneous movement of said shearing members alternately toward and from each other transversely of the path of travel of said material, without causing said members to intersect said path, and periodically increasing the amount of said last mentioned movement to cause said shearing members to effect shearing of said material, substantially as described.

4. In a method of shearing, the steps consisting in continuously moving the material to be sheared, continuously moving a shearing member on each side of said material alternately in the direction of movement of said material and in the opposite direction, normally continuously concomitantly producing simultaneous movement of said shearing members alternately toward and from each other transversely of the path of travel of said material, without causing said members to intersect said path, and periodically increasing the amount of said last mentioned movement to cause said shearing members to effect shearing of said material, substantially as described.

5. In a method of shearing, the steps consisting in continuously moving the material to be sheared, continuously moving a shearing member on each side of said material in such manner as to cause the cutting edge of each member to trace an endless curved path which normally does not intersect the path of travel of the material, and periodically producing a relative shifting of said paths to effect the shearing of said material, substantially as described.

6. In a method of shearing, the steps consisting in continuously moving the material to be sheared at a predetermined speed, intermittently simultaneously moving a pair of shearing members on opposite sides of said material in the direction of travel and at substantially the speed of the latter and concomitantly producing relative movement of said members toward and from each other, without causing said members to intersect the path of travel of said material, and periodically producing a modification of said relative movement to cause said members to effect shearing of said material, substantially as described.

7. In a shear, a pair of shearing members, means for normally producing a relative movement of said members toward and from each other transversely of the path of travel of the material to be sheared, without effecting shearing of said material, and means for periodically increasing the amount of said relative movement to cause said members to effect shearing of the material, substantially as described.

8. In a shear, a pair of shearing members, means for normally continuously producing a relative movement of said members toward and from each other transversely of the path of travel of the material to be sheared, without effecting shearing of said material, and means for periodically increasing the amount of said relative movement to cause said members to effect shearing of the material, substantially as described.

9. In a shear, a pair of shearing members, means for normally continuously moving said members toward and from each other transversely of the path of travel of the material to be sheared, without effecting shearing of said material, and means for periodically producing a modification of said movement to cause said members to effect shearing of the material, substantially as described.

10. In a shear, a pair of shearing members, means for normally moving said members toward and from each other transversely of the path of travel of the material to be sheared, without effecting shearing of said material, and means for periodically increasing the amount of said movement to cause said members to effect shearing of the material, substantially as described.

11. In a shear, a pair of shearing members, means for reciprocating said members in the direction of travel of the material to be sheared and in the opposite direction and concomitantly producing a relative movement of said members toward and from each other transversely of the path of travel of said material, without effecting shearing of said material, and means for periodically increasing the amount of said relative movement to cause said members to effect shearing of the material, substantially as described.

12. In a shear, a pair of shearing members, means for continuously actuating said members in such manner as to cause the same to intermittently move in the direction of travel of the material to be sheared and concomitantly relatively move toward and from each other transversely of the path of travel of said material, without effecting shearing of said material, and means for periodically producing a modification of said relative movement to effect shearing of the material, substantially as described.

13. In a shear, a pair of shearing members, means for continuously moving the material to be sheared at a predetermined speed, means for intermittently moving said members in the direction of travel of said material at substantially the same speed as the latter and for concomitantly producing a relative movement of said members toward and from each other transversely of the path of travel of said material, without effecting shearing of said material, and means for periodically increasing the amount of said relative movement to cause said members to effect shearing of said material, substantially as described.

14. In a shear, a pair of shearing members, means for normally producing a relative movement of said members toward and from each other transversely of the path of travel of the material to be sheared, without effecting shearing of said material, means for increasing the amount of said relative movement to cause said members to effect shearing of said material, and means for periodically actuating said last mentioned means, said actuating means having provision whereby to vary the time interval between successive shearing operations, substantially as described.

15. In a shear, a bodily movable lower supporting member, a bodily movable upper supporting member, shearing means on each of said members, and means for bodily moving said members in the direction of travel of the material to be sheared and concomitantly producing a relative pivotal movement between said members to cause said shearing means to approach each other, substantially as described.

16. In a shear, a bodily movable lower supporting member, a bodily movable upper supporting member, shearing means on each of said members, means for bodily moving said members in the direction of travel of the material to be sheared and concomitantly producing relative movement between said members in a direction transverse to the path of travel of said material, said relative movement being normally insufficient to cause said shearing means to effect shearing of the material, and means for periodically increasing the amount of said relative movement to cause said shearing means to effect shearing of the material, substantially as described.

17. In a shear, shearing levers, means for normally bodily moving said levers, and means for periodically providing a fulcrum for each of said levers for effecting angular movement of said levers by said first mentioned means, substantially as described.

18. In a shear, shearing levers, shearing means carried by said levers, a support for each of said levers upon which the same is pivotally mounted, means for actuating said supports to normally effect bodily movement of said levers, and means for periodically providing a fulcrum for each of said levers whereby movement of said supports effects angular movement of said levers about the same to cause said shearing means to cross the path of travel of the material to be sheared, substantially as described.

19. In a shear, a pair of crank-shafts, a shearing lever pivotally mounted upon the crank portion of each of said shafts and adapted to be normally bodily moved by the rotation of said shafts, shearing means carried by said levers, normally inoperative means effective when moved to operative position to cause the rotation of said crank-shafts to effect angular movement of said levers about said crank-shafts to thereby cause said shearing means to cross the path of travel of the material to be sheared once for each revolution of said crank-shafts, a driven shaft, means carried by said driven shaft for moving said normally inoperative means to operative position once for each revolution of said driven shaft, and common means for driving said crank-shafts and driven shaft including means for varying the speed of rotation of said driven shaft while maintaining that of the crank-shafts constant, substantially as described.

20. In a shear, shearing knives, power means for operating said shearing knives at a predetermined speed, means operated by said power means for delivering material to be sheared to said knives and means in the driving connection between said power means and delivery means for regulating the speed of the latter without affecting the speed of operation of the knives, substantially as described.

21. In a shear, shearing knives, power means for operating said shearing knives at a predetermined speed, means operated by said power means for delivering material to be sheared to said knives, and means for regulating the speed of delivery of said material independently of the speed of operation of said knives or of said power means, substantially as described.

22. In a shear, shearing members, means for delivering material to be sheared to said members, and common means for operating said members and delivery means at predetermined speeds, including differential gearing for varying the speed of delivery of the material while maintaining the speed of operation of said members constant, substantially as described.

23. In a shear, shearing members, means for operating said members at a predetermined speed, means normally ineffective for delivering material to be sheared to said members, means for operating said normally ineffective means by the operating means for said members, and means operable in timed relation to the operation of said members for rendering said normally ineffective means effective, substantially as described.

24. In a shear, shearing members, means for operating said members at a predetermined speed, normally inoperative means for delivering material to be sheared to said members, means for operating said normally inoperative means by the operating means for said members, and adjustable means operable in timed relation to the operation of said members for rendering said normally inoperative means operative, substantially as described.

25. In a shear, a pair of shearing members, means for intermittently relatively moving said shearing members into cooperative shearing relation, normally inoperative means for feeding material to be sheared to said members, and means for initiating operation of said normally inoperative means in timed relation to said intermittent movement of said members, substantially as described.

26. In a shear, shearing members, power means for operating said members, a pair of starting pinch rolls for delivering material to be sheared to said members, means operatively connecting one of said rolls with said power means whereby said roll is adapted to be continuously driven by said power means, the other of said rolls being arranged to be driven frictionally through the material by the driven roll, means normally maintaining said last mentioned roll out of position to engage the material, and means operable by said power means in timed relation to the operation of said shearing members for moving said last mentioned roll into position to engage the material, substantially as described.

27. In a shear, a pair of shearing knives, power means adapted to continuously reciprocate said knives on opposite sides of the path of travel of the material to be sheared, means actuated by said power means for delivering the material to said knives, adjustable means including differential gearing in the driving connection between said power means and delivery means for regulating the speed of delivery of the material without affecting the speed of operation of the knives, means actuated by said power means effective to cause said knives to periodically cross the path of travel of the material to effect shearing of the same, and change speed gearing in the driving connection between said last mentioned means and said power means to vary the time interval between successive shearing operations, substantially as described.

In testimony whereof I have hereunto set my hand.

FLORENCE C. BIGGERT, Jr.